Jan. 24, 1939.     J. J. MEAGHER ET AL     2,144,806

RIDING TRAILER

Filed May 4, 1938

John J. Meagher
Bernard F. Meagher    INVENTORS
BY
Gardner W. Pearson
           ATTORNEY.

Patented Jan. 24, 1939

2,144,806

UNITED STATES PATENT OFFICE 2,144,806

RIDING TRAILER

John J. Meagher, East Chelmsford, and Bernard F. Meagher, Lowell, Mass.

Application May 4, 1938, Serial No. 205,932

2 Claims. (Cl. 280—33.4)

Figure 1:
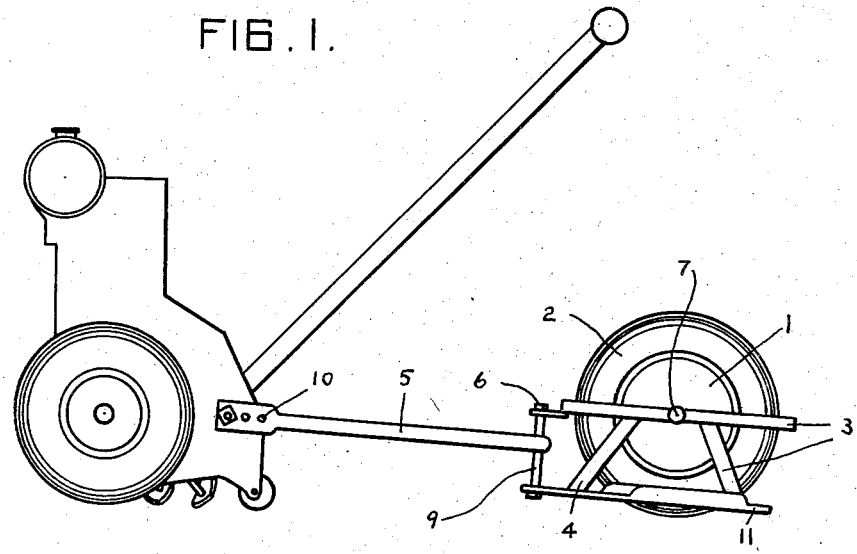
Figure 2:
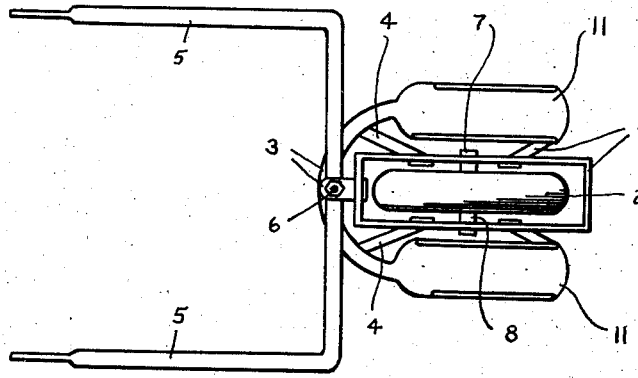
Figure 3:
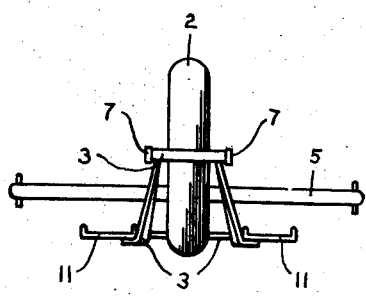

The invention relates to an improvement in riding trailers whereby the passenger is in a standing position instead of being seated. The advantage being that objects in the path of power mowers and tractors can be removed by the operator of these machines with more facility and less effort than if seated. The drawing shows a trailer particularly adapted for power lawn mowers.
Fig. 1 in the accompanying drawing is a side elevation of the trailer attached to a power lawn mower. Fig. 2 is a plan view and Fig. 3 is a rear elevation.

The trailer consists of a standard disc wheel 1 equipped with ball bearing axle 8 and standard 16" by 4.00 two ply pneumatic tire 2. (A smaller wheel and tire could be used.) The wheel is attached to a light welded steel framework 3 by means of a carriage bolt 7. Two steel bumpers 4 are welded on to the frame 3 in such a manner that they prevent the wheel from striking the tube frame 5 when making a short turn. These bumpers also serve to strengthen the framework and help to support the foot rests 11, 11 proximate the ground and below the center of the wheel 1.

A swivel joint with ball bearings and a bolt or rod 6 with heads or nuts at the top and bottom passes through a sleeve 9 inserted thru the tube frame 5. This unit provides a means of changing the direction of the wheel.

The tube frame 5 is made of one inch tube bent to the proper shape. The ends of the tube are pressed together and three holes 10 for adjustment purposes are drilled thru to attach the trailer to power lawn mowers or tractors.

The tube frame is a connecting frame between the trailer and a power lawn mower and may be adjusted by means of bolts or screws passing through one or more of the holes 10 into the frame of the power lawn mower so that the connection is pivotal or rigid. If the connection is pivotal, it is a horizontal pivot and permits the front of the frame 5 to be lifted with the rear of the lawn mower to allow the cutter of the lawn mower to clear articles, such as sticks or stones, in its path. If the connection is rigid, the one-wheeled trailer is so light that it, together with the frame 5, can all be lifted together.

The vertical pivot comprising sleeve 9 and bolt 6 should be long enough to keep the single wheel 1, the frame and the whole trailer substantially upright. The single wheel on this pivot allows running close to the adjoining sides of a monument, the trailer following the lawn mower.

The use of riding trailers in cemeteries has been very limited because of the numerous objects on the lawn such as flower vases, monuments, emblems, etc., causing frequent starting and stopping. If an operator is seated, under these conditions, the advantage of a riding trailer is lost. For that reason we have developed the trailer described above which has greatly increased the area that may be covered by power mowers in a given length of time.

We claim:
1. For use with a power driven lawn mower, a riding trailer including a substantially rigid connecting frame comprising side bars and a back bar, the ends of the side bars being provided with attaching means for pivotally connecting them with the lawn mower and including a vertical pivot member rigidly carried by the back bar and a trailer carriage attached to such vertical pivot member and including a riding frame supported by one wheel and comprising two foot rests, one on each side of and below the center of the wheel and proximate the ground.
2. For use with a power driven lawn mower, a riding trailer including a substantially rigid connecting frame including two members for attaching to the lawn mower and a medially positioned vertical pivot member rigidly carried at the back of the connecting frame and a trailer carriage attached to such vertical pivot member and including a single supporting wheel, a riding frame which extends only proximate the supporting wheel and which includes two foot rests, on each side of the wheel and proximate the ground.

JOHN J. MEAGHER.
BERNARD F. MEAGHER.